United States Patent [19]
Takusagawa et al.

[11] Patent Number: 4,915,150
[45] Date of Patent: Apr. 10, 1990

[54] PNEUMATIC TIRES WITH ROUND AND SQUARE SHOULDERS

[75] Inventors: Takashi Takusagawa, Ohme; Akira Kurima, Higashimurayama; Yuji Tateo, Kodaira; Nobuyuki Kasahara, Hachioji, all of Japan

[73] Assignee: Bridgestone Corporation, Tokyo, Japan

[21] Appl. No.: 195,066

[22] Filed: May 17, 1988

[30] Foreign Application Priority Data

May 20, 1987 [JP] Japan .................. 62-121007

[51] Int. Cl.$^4$ .................................. B60C 11/01
[52] U.S. Cl. .................. 152/209 B; 152/209 R; D12/152
[58] Field of Search .......... 152/209 R, 209 A, 209 D, 152/209 B, 454; D12/152

[56] References Cited

U.S. PATENT DOCUMENTS

| | | | |
|---|---|---|---|
| D. 120,687 | 5/1940 | Modnan | D12/152 |
| 2,592,557 | 4/1952 | Gibbs | 152/209 R |
| 3,818,965 | 6/1974 | Newman | 152/209 R |
| 3,858,633 | 1/1975 | Boileau | 152/209 R |
| 4,383,567 | 5/1983 | Crum et al. | 152/209 B |
| 4,664,167 | 5/1987 | Kawakami et al. | 152/209 B |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A pneumatic tire has plural lugs defined by plural notches in at least a tread side region. These lugs have an alternate structure of round shoulders and square shoulder between mutual adjoining lugs.

3 Claims, 3 Drawing Sheets

FIG_1
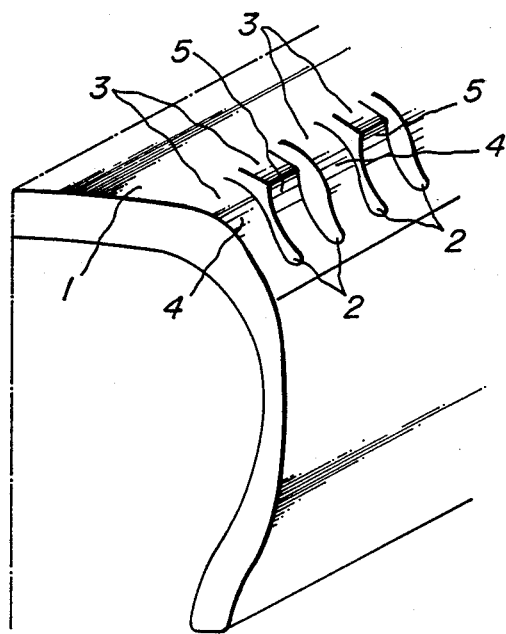
FIG_2
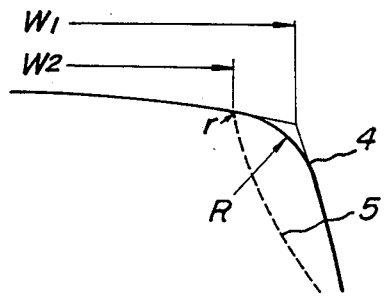

FIG_3
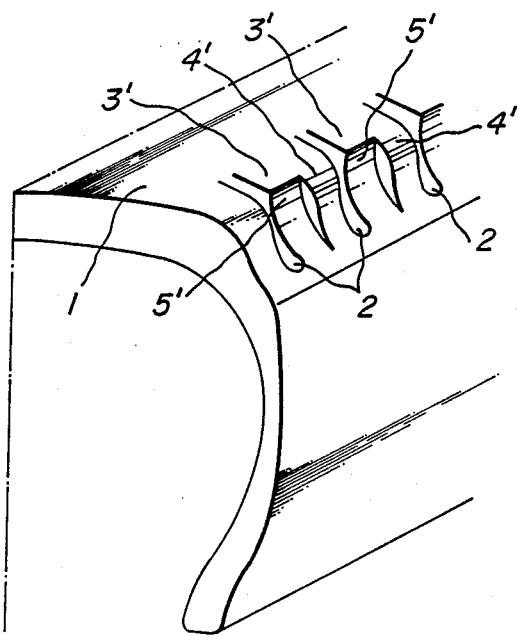

FIG_4
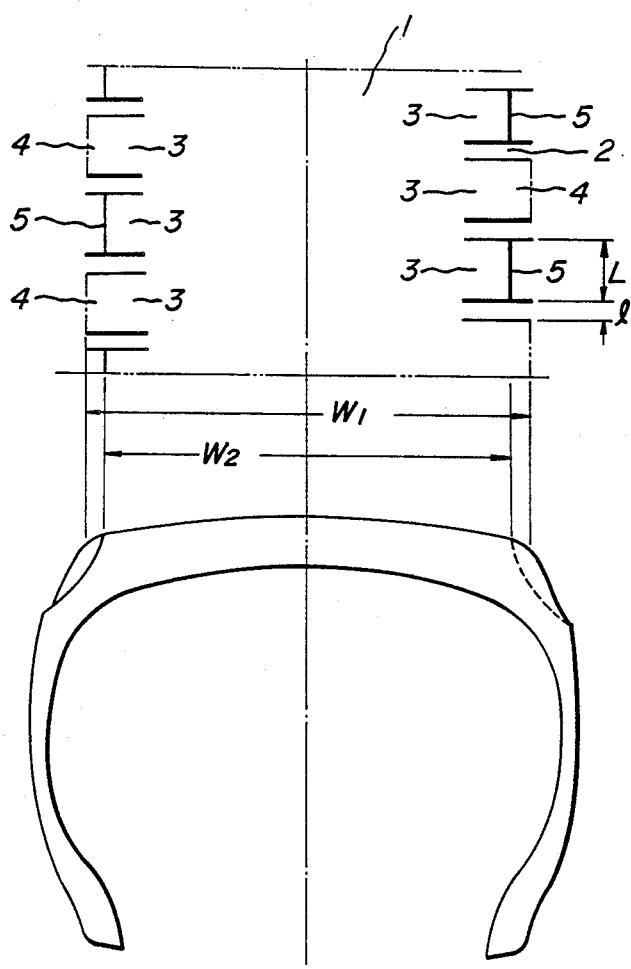

PNEUMATIC TIRES WITH ROUND AND SQUARE SHOULDERS

BACKGROUND OF THE INVENTION

1. Field of the Invention

This invention relates to pneumatic tires, and more particularly to an improvement in a shoulder portion of a pneumatic tire having plural lugs defined by notches in each of tread side regions.

2. Related Art Statement

In each side edge region of the tread portion of the tire is arranged either a so-called square shoulder having a substantially squarish section in accordance with the purpose of the tire use.

Even in a pneumatic tire having plural lugs in each side region of the tire tread, the round shoulder or the square shoulder is applied to the side edge of the lug in accordance with the purpose of the tire use.

As is well-known, tires having a so-called round shoulder, wherein an axial end of a lug defined by transverse grooves arranged at a predetermined interval in the circumferential direction of the tire tread exhibits a round shape in the transverse section of the tire, are suitable in the running on general road conditions and can ensure the smooth steering stability, but are lacking in the gripping force in a direction crossing to the running direction of the vehicle due to the absence of gripping against road surface on snow road, muddy road or the like, so that they have still a problem in the straight running property and cornering properties.

On the other hand, tires having a so-called square shoulder, wherein the axial end of the lug exhibits a square shape in the transverse section of the tire, are excellent in the straight running property and cornering properties because the gripping force in a direction crossing to the running direction of the vehicle is strong, so that they are suitable for use on a snow covered road, muddy road or the like. However, when they are run on general road particularly provided with wheel tracks, the lug is apt to be caught by the wheel track and the reaction force accompanied therewith makes the directional control unstable to degrade the straight running property.

SUMMARY OF THE INVENTION

It is, therefore, an object of the invention to advantageously solve the aforementioned problem in the tire having plural lugs in the tread side region and to achieve the stable running of the tire on any kinds of road.

According to the invention, there is the provision of a pneumatic tire having plural lugs defined at an approximately equal interval in circumferential direction of a tread by plural notches formed in at least a side region of the tire tread, characterized in that said lugs have an alternate structure of round shoulder and square shoulder between mutual adjoining lugs.

In a preferred embodiment of the invention, the round shoulder of the lug is arranged to protrude outward from the square shoulder of the lug between the mutual adjoining lugs.

BRIEF DESCRIPTION OF THE DRAWINGS

FIG. 1 is a partial perspective view of a first embodiment of the pneumatic tire according to the invention;

FIG. 2 is a schematic view showing each of lug shoulders;

FIG. 3 is a partial perspective view of a second embodiment of the pneumatic tire according to the invention; and FIG. 4 is a plan developed view of the first embodiment shown in FIG. 1.

DESCRIPTION OF THE PREFERRED EMBODIMENTS

In FIG. 1 is illustrated a tread side region of a first embodiment of the pneumatic tire according to the invention.

Numeral 1 is a tread portion of the tire, numeral 2 a notch or groove formed in each side region of the tread portion 1 at an approximately equal interval on the circumference thereof and generally extending in the axial direction of the tire, and numeral 3 a lug defined by the notch 2 on the circumference of the tread. In this case, the lugs 3 are comprised by alternately arranging a round shoulder 4 whose axial end has a round shape and a square shoulder 5 whose axial end has a square shape between mutual adjoining lugs. Moreover, the notch 2 can be extended near to the equator of the tire or over the equator in parallel to the axial direction or at a predetermined inclination angle with respect to the axial direction.

In this embodiment, the round shoulder 4 protrudes outward from the square shoulder 5. Furthermore, as shown in cross-section in FIG. 2, it is advantageous to set a ratio ($W_2/W_1$) of tread width of lug 3 having the square shoulder 5 ($W_2$) to tread width of lug 3 having the round shoulder 4 ($W_1$) to a range of 0.8~0.98.

Moreover, it is preferable that the curvature of the tread side edge portion, i.e. the curvature of each shoulder satisfies such a condition that the radius of curvature R in the round shoulder is $5 \leq R \leq 50$(mm) and the radius of curvature r in the square shoulder is $0 \leq r \leq 5$(mm) and the radius of curvature of the round shoulder is larger than that of the square shoulder as shown in FIG. 2.

FIG. 3 shows a second embodiment of the pneumatic tire according to the invention, wherein the lug 3' defined by the notches 2 is a combination of a round shoulder 4' and a square shoulder 5'. In this combination, the circumferential region of the round shoulder is 4' is approximately equal to that of the square shoulder 5'. However, the circumferential region of the round shoulder can be made longer than that of the square shoulder in accordance with the tire use.

In the pneumatic tire according to the invention, the smooth steering stability is ensured on general road by the function of the round shoulder, that is, the straight running property is stably obtained without losing the directional control due to the wheel track, while the gripping force in a direction crossing to the running direction of the vehicle is ensured on snow road, muddy road or the like by the function of the square shoulder, whereby the straight running property and cornering stability can stably be obtained. Therefore, the tires according to the invention can develop excellent performances against all roads because they do not select particular road conditions.

Moreover, when the round shoulder protrudes outward from the square shoulder, the straight running stability inherent to the round shoulder can be more ensured because the contact with the wheel track is always produced in the outer round shoulder and the directional control is not obstructed by the catching on the wheel track.

The invention will be described with reference to the following example.

(EXAMPLE)

In FIG. 4 is shown a plan developed view in the transverse section of the tire shown in FIG. 1. At first, a test tire having a tire size of 31×10.50 R15LT was manufactured as a tire A shown in FIGS. 1 and 4. In this case, the main parts of the tire other than the tread side region were omitted because they were the same as in the conventional tire.

In the tire A, the tread width $W_1$ in the lug 3 having the round shoulder 4 was 206 mm, the tread width $W_2$ in the lug 3 having the square shoulder 5 was 195 mm, the radius of curvature R of the round shoulder 4 was 15 mm, the radius of curvature r of the square shoulder 5 was 2 mm, the lug length L in the circumferential direction was 31 mm, and the width l of the notch 2 was 27 mm. Moreover, the ratio of L/l may properly be set in accordance with the use purpose. Moreover, the notch 2 extends inward from the standard line $W_1$ to 81 mm in the axial direction.

The tire shown in FIG. 3 was manufactured as a tire B. In this case, the circumferential length of the lug 3' and 31 mm as in the tire A, and the circumferential length of each of the round shoulder 4' and the square shoulder 5' was 15.5 mm, and the width of the notch 2 was 27 mm as in the tire A. The other conditions were the same as in the tire A.

For comparison, there were provided tire C having lugs each composed of only round shoulder and tire D having lugs each composed of only square shoulder. The size of these tires were substantially the same as in the tire A.

The comparative tests for the steering stability on general road, performance on snow road, performance on muddy road and wheel track riding performance were made with respect to these tires A~D to obtain results as shown in the following table.

|  | Tire A | Tire B | Tire C | Tire D |
|---|---|---|---|---|
| Steering stability on general road | 100 | 100 | 100 | 89 |
| Performance on snow road | 122 | 120 | 100 | 125 |
| Performance on muddy road | 112 | 110 | 100 | 114 |
| Wheel track riding performance | 100 | 100 | 100 | 80 |

(Note) The performance was represented by an index on the basis that the conventional tire C was 100. The larger the index value, the better the performance.

The test for the steering stability on a general road was made by actually running the vehicle on a paved road, from which the steering stability was evaluated by feeling.

The test for the performance on a snow covered road was made by actually running the vehicle on snowy road, from which the steering stability as well as traction and braking performances were evaluated by feeling.

The test for the performance on a muddy road was made by actually running the vehicle on relatively soft ground, from which the difficulty of the running was evaluated by feeling.

The test for the wheel track riding performance was made by actually wandering the vehicle, from which the performance was evaluated by feeling.

As mentioned above, the pneumatic tires according to the invention simultaneously possess the merits inherent to both the round and square shoulders, so that they can be widely applied to applications without specifying the road conditions.

What is claimed is:

1. A pneumatic tire having plural lugs defined at an approximately equal interval in a circumferential direction of a tread by plural notches formed in at least a side region of the tire tread, said lugs comprising in cross-section an alternate structure of a square shoulder lug and a round shoulder lug protruding outward from said square shoulder lug in the axial direction of the tire and separated by a mutual adjoining notch, said lug with the square shoulder having a tread width to that of said lug with the round shoulder in the range of 0.8~0.98, and wherein said lug with a round shoulder has a radius of curvature larger than the radius of curvature of said square shoulder.

2. A pneumatic tire having plural lugs defined at an approximately equal interval in a circumferential direction of a tread by plural notches formed in at least a side region of the tire tread, comprising in cross-section; a lug with a combination of a square shoulder portion and a round shoulder portion protruding outward from said square shoulder portion in the axial direction of the tire and, wherein said square shoulder portion having a tread width to that of said round shoulder portion in the range of 0.8~0.98 and said round shoulder portion has a radius of curvature larger than the radius of curvature of said square shoulder portion.

3. The pneumatic tire according to claim 7, wherein said round shoulder portion has a radius of curvature of 5~50 mm and said square shoulder portion has a radius of curvature of not more than 5 mm.

* * * * *